(12) United States Patent
Scanlon et al.

(10) Patent No.: US 9,302,332 B2
(45) Date of Patent: Apr. 5, 2016

(54) TWIST DRILL ASSEMBLY, COMPONENTS FOR SAME AND METHOD FOR MAKING SAME

(75) Inventors: Terry Scanlon, Co. Clare (IE); John James Barry, Co. Clare (IE); James Doyle, Co. Clare (IE)

(73) Assignee: Element Six Limited, County Clare (IE)

( * ) Notice: Subject to any disclaimer, the term of this patent is extended or adjusted under 35 U.S.C. 154(b) by 478 days.

(21) Appl. No.: 13/822,211

(22) PCT Filed: Sep. 14, 2011

(86) PCT No.: PCT/EP2011/065954
§ 371 (c)(1),
(2), (4) Date: Jun. 10, 2013

(87) PCT Pub. No.: WO2012/035070
PCT Pub. Date: Mar. 22, 2012

(65) Prior Publication Data
US 2013/0302101 A1  Nov. 14, 2013

Related U.S. Application Data

(60) Provisional application No. 61/384,065, filed on Sep. 17, 2010.

(30) Foreign Application Priority Data

Sep. 17, 2010  (EP) ...................................... 1015541

(51) Int. Cl.
*B23B 51/06* (2006.01)
*B23P 15/32* (2006.01)

(52) U.S. Cl.
CPC ................ *B23B 51/06* (2013.01); *B23P 15/32* (2013.01); *B23B 2224/28* (2013.01);
(Continued)

(58) Field of Classification Search
CPC .............. B23B 51/06; B23B 2251/202; B23B 2251/408; B23P 15/32; Y10T 408/45; Y10T 408/455; Y10T 408/9097
USPC ........................................................... 408/59
See application file for complete search history.

(56) References Cited

U.S. PATENT DOCUMENTS 2,412,939 A * 12/1946 Aston ............................. 408/59
2,422,994 A    6/1947 Taylor
(Continued)

FOREIGN PATENT DOCUMENTS

CA         1278710      1/1991
DE         3600681 A1   5/1987
(Continued)

OTHER PUBLICATIONS

International Search Report for PCT/EP2011/065954 dated Dec. 8, 2011.

*Primary Examiner* — Eric A Gates
(74) *Attorney, Agent, or Firm* — Armstrong Teasdale LLP (57) ABSTRACT

A twist drill assembly (10) comprising a shaft (30) and a drill tip (20); the shaft having a single internal shaft conduit (34) for a fluid, extending between orifices (36, 37) formed into the shaft; the drill tip having an internal drill tip conduit (22) for the fluid, extending between orifices formed into the drill tip; the shaft and the drill tip configured such that the drill tip is connectable to an end of the shaft with the internal drill tip conduit in communication with the internal shaft conduit, allowing the fluid to be capable of flowing from the internal shaft conduit into the internal drill tip conduit; the internal shaft conduit having a spiral form aligned with a central longitudinal axis of the shaft, and configured to complement the arrangement of spiral flutes (38) formed on the shaft.

19 Claims, 5 Drawing Sheets

(52) U.S. Cl.
CPC .... *B23B 2226/125* (2013.01); *B23B 2226/315* (2013.01); *B23B 2226/72* (2013.01); *B23B 2240/08* (2013.01); *B23B 2251/02* (2013.01); *B23B 2251/202* (2013.01); *B23B 2251/408* (2013.01); *Y10T 408/455* (2015.01); *Y10T 408/81* (2015.01); *Y10T 408/9097* (2015.01)

(56) References Cited

U.S. PATENT DOCUMENTS

| | | | | |
|---|---|---|---|---|
| 2,847,885 | A | * | 8/1958 | Wagner ............... 408/59 |
| 3,040,605 | A | | 6/1962 | Andreasson |
| 3,359,837 | A | | 12/1967 | Andreasson |
| 3,591,302 | A | * | 7/1971 | Andreasson ............ 408/59 |
| 3,893,353 | A | | 7/1975 | Lahmeyer |
| 4,059,031 | A | | 11/1977 | Erdelyi |
| 4,527,643 | A | | 7/1985 | Horton et al. |
| 4,594,034 | A | * | 6/1986 | Maier ................. 408/230 |
| 4,627,503 | A | | 12/1986 | Horton |
| 4,694,918 | A | | 9/1987 | Hall |
| 4,704,055 | A | | 11/1987 | Guhring |
| 4,713,286 | A | | 12/1987 | Bunting et al. |
| 4,744,705 | A | | 5/1988 | Imanaga |
| 4,762,445 | A | | 8/1988 | Bunting et al. |
| 4,779,440 | A | | 10/1988 | Cleve et al. |
| 4,826,364 | A | * | 5/1989 | Grunsky ............... 408/59 |
| 4,830,000 | A | * | 5/1989 | Shutt .................. 606/80 |
| 4,861,673 | A | | 8/1989 | Hara et al. |
| 4,991,467 | A | | 2/1991 | Packer |
| 5,031,484 | A | | 7/1991 | Packer |
| 5,115,697 | A | | 5/1992 | Rodriguez et al. |
| 5,174,692 | A | * | 12/1992 | Martin ................ 408/56 |
| 5,370,195 | A | | 12/1994 | Keshavan et al. |
| 5,580,196 | A | | 12/1996 | Thompson |
| 5,678,960 | A | * | 10/1997 | Just et al. ............. 408/230 |
| 5,780,063 | A | | 7/1998 | Friedrichs |
| 5,980,166 | A | | 11/1999 | Ogura |
| 6,030,155 | A | * | 2/2000 | Scheer et al. ........... 408/59 |
| 6,045,301 | A | | 4/2000 | Kammermeier et al. |
| 6,045,305 | A | * | 4/2000 | Plummer .............. 408/230 |
| 6,065,908 | A | * | 5/2000 | Kleine et al. ........... 408/67 |
| 6,283,682 | B1 | * | 9/2001 | Plummer .............. 408/57 |
| 6,540,452 | B1 | * | 4/2003 | Bolkart et al. .......... 408/230 |
| 6,595,305 | B1 | * | 7/2003 | Dunn et al. ........... 175/420.1 |
| 6,698,981 | B1 | * | 3/2004 | Beno et al. ............ 408/59 |
| 6,821,061 | B2 | * | 11/2004 | Frejd ................. 408/59 |
| 6,929,434 | B2 | | 8/2005 | Prokop |
| 7,131,799 | B2 | * | 11/2006 | Stokey et al. ........... 408/230 |
| 7,134,813 | B2 | | 11/2006 | Kleiner |
| 7,137,462 | B2 | * | 11/2006 | Miyanaga ............. 175/398 |
| 7,201,543 | B2 | | 4/2007 | Muhlfriedel et al. |
| 7,740,426 | B2 | * | 6/2010 | Yamamoto ............ 408/230 |
| 8,678,072 | B2 | * | 3/2014 | Shavit ................ 164/113 |
| 2005/0214082 | A1 | | 9/2005 | Dasch |
| 2008/0080938 | A1 | | 4/2008 | Makino et al. |
| 2012/0003054 | A1 | * | 1/2012 | Takagi et al. .......... 408/1 R |
| 2015/0104265 | A1 | * | 4/2015 | Itoh et al. ............ 408/230 |

FOREIGN PATENT DOCUMENTS

| | | | |
|---|---|---|---|
| DE | 3709647 | A1 * | 10/1988 |
| DE | 42 42 336 | A1 | 6/1994 |
| DE | 103 33 666 | A1 | 6/2004 |
| DE | 20 2009 013 808 | U1 | 3/2010 |
| DE | 10 2009 043 805 | A1 | 3/2011 |
| EP | 0 118 035 | A1 | 9/1984 |
| EP | 0 528 243 | A2 | 2/1993 |
| EP | 2 123 381 | A1 | 11/2009 |
| FR | 854545 | A * | 4/1940 |
| JP | 64 002807 | A | 1/1989 |
| JP | 64002808 | A * | 1/1989 |
| JP | 1 051218 | A | 2/1989 |
| JP | 2001252811 | | 9/2001 |
| WO | WO 0061323 | A1 * | 10/2000 |
| WO | WO 2010055559 | A1 * | 5/2010 |
| WO | WO 2014155527 | A1 * | 10/2014 |

* cited by examiner

TWIST DRILL ASSEMBLY, COMPONENTS FOR SAME AND METHOD FOR MAKING SAME

This disclosure relates generally to twist drills, twist drill assemblies, components for twist drill assemblies and a method for making a twist drill.

A twist drill can be described generally as a rotary end cutting tool having one or more cutting faces or lips, and also one or more helical or straight flutes for conveying chips from a hole being drilled. Twist drills are a common type of drill and may be used for drilling holes in metal, plastic, wood and masonry. Twist drills are manufactured from a variety of materials such as low carbon steel, high carbon steel, high speed steel and cobalt steel. Solid carbide drills are also common and if better wear resistance is required, tipped tools are often used. Tipped tools may include tungsten carbide tips, or points, that are secured to the drill body. Where enhanced wear resistance is required, a super-hard structure may be incorporated into the drill tip.

U.S. Pat. No. 4,704,055 discloses a twist drill comprising a cooling channel extending spirally through the head. U.S. Pat. No. 5,580,196 discloses twist drill bits comprising a layer of PCD or PCBN of substantially uniform axial thickness extending over substantially the whole top surface of the tip of the drill. Japanese patent application publication number 2001-252811 discloses a drill comprising a tip including a cBN or diamond layer.

There is a need for robust twist drills capable of conveying fluid to an enhanced drill tip.

Viewed from a first aspect there is provided a twist drill assembly comprising a shaft and a drill tip; the shaft having a single internal shaft conduit for a fluid, extending between orifices formed into the shaft; the drill tip having an internal drill tip conduit for the fluid, extending between orifices formed into the drill tip; the shaft and the drill tip configured such that the drill tip is connectable to an end of the shaft with the internal drill tip conduit in communication with the internal shaft conduit, allowing the fluid to be capable of flowing from the internal shaft conduit into the internal drill tip conduit; the internal shaft conduit having a generally spiral form substantially aligned with a central longitudinal axis of the shaft, and configured substantially to complement the arrangement of spiral flutes formed on the shaft.

Various arrangements and combinations of features of the drill tip, shaft and other aspects are envisaged by the disclosure and non-limiting and non-exhaustive example arrangements are described below.

Viewed from a second aspect, there is provided a shaft for a twist drill assembly according to this disclosure, comprising a single internal shaft conduit for a fluid, extending between orifices formed into the shaft; the internal shaft conduit having a spiral form generally aligned with a central longitudinal axis of the shaft, and configured to complement the arrangement of spiral flutes formed on the shaft. The shaft may be formed of cemented tungsten carbide.

The internal shaft conduit may be configured to have a sufficiently large cross-sectional area to allow a desired predetermined flux of fluid to pass through it and be arranged within the shaft to maximise the thickness of the wall between the internal shank conduit and the innermost surface of the flutes, given the required cross-sectional area. In some arrangements, the lateral cross-section area of the internal shaft conduit may be at most about 10 percent or at most about 5 percent of the lateral cross-section area of the shaft (excluding the cut-away area of flutes).

The shaft may have a proximate end configured for connection to a drill tip and a distal end for connection to a drilling machine; the internal shaft conduit extending between an inlet orifice and an outlet orifice at the proximate end. The internal shaft conduit may be configured spirally and in phase with a spiral flute formed on the shaft, so that the minimum thickness of a shaft wall between the internal shaft conduit and the flute remains substantially constant along the length of the flute, or at least a major part of the length of the flute, and or increases continuously by a relatively small amount from the tip of the proximate end of the shank towards the distal end.

In arrangements in which the shaft comprises two flutes, the internal shaft conduit may be configured to present a generally oval or generally elliptical shape in lateral cross-section through the shaft. The elliptical shape may have a major and a minor dimension, the ratio of the major dimension to the minor dimension being at least about 1.5 or at least about 2 and at most about 4 or at most about 3. In arrangements in which the shaft has three flutes, the internal shaft conduit may present a three-lobed shape in lateral cross section through the shaft, oriented such that the lobes are disposed circumferentially between the flutes. In general, in arrangements in which the shaft has N flutes, the internal shaft conduit may present an N-lobed shape in lateral cross section through the shaft, oriented such that the lobes are disposed circumferentially between the flutes. The lobes may appear as projections from a core region of the conduit.

The drill tip may comprise comprises a structure consisting of PCD or PCBN material, the internal drill tip conduit being at least partly defined by the structure. The drill tip may consist essentially of cBN or PCD material. The drill tip may comprise advanced ceramic material selected from the group consisting of tungsten carbide, titanium carbide, boron carbide, silicon carbide, silicon nitride, alumina and boron suboxide.

Viewed from a third aspect, there is provided a drill tip for a twist drill assembly according to this disclosure, comprising at least one internal drill tip conduit for a fluid, extending between orifices formed into the drill tip; the drill tip comprising a structure consisting of PCD or PCBN material, the internal drill tip conduit being at least partly defined by the structure.

Viewed from a fourth aspect there is provided an assembled twist drill comprising a twist drill assembly according to this disclosure can be provided, the drill tip being connected to the shaft by means of a braze material disposed between the drill tip and the shaft.

Disclosed arrangements may have the aspect of providing a twist drill capable of transmitting fluid to the drill tip and having a relatively strong shaft. The internal shaft conduit may be configured to achieve a good balance between cross-sectional area of the shaft conduit and the thickness of the shaft wall between the shaft conduit and the flute, since the cross-sectional shape of the shaft conduit may be generally elongated (substantially non-circular) and arranged complementary to the flute to maintain a substantially uniform minimum wall thickness. This may have the effect of allowing a relatively large flux of fluid to flow through the shaft conduit while maintaining a relatively high strength of the shaft. In arrangements where the internal shaft conduit is generally elliptical, if the ratio of the major to the minor dimension is substantially less than about 1.5 then it may not be possible to achieve a sufficiently high flux of fluid as well as a sufficiently thick shaft wall. It is likely to be practically rather difficult to make a shaft comprising elliptical internal shaft in which this ratio is substantially greater than about 4.

Viewed from a fifth aspect there is provided a method of making a twist drill according to this disclosure, the method including providing a shaft according to this disclosure, the shaft comprising a single internal shaft conduit presenting an orifice at an end of the shaft; providing a drill tip according to the disclosure; joining the tip to the end of the shaft by means of braze material and boring at least one internal drill tip conduit through the drill tip; the internal drill tip conduit extending from a working surface of the drill tip to the orifice of the internal shaft conduit. The method may include boring the internal drill tip conduit by means of electro-discharge means or laser means.

The drill tip may comprise a super-hard structure consisting of PCD or PCBN material, and the method may include boring at least one internal drill tip conduit through the super-hard structure.

In some arrangements, the drill tip may be connected or connectable to the shaft by means of brazing or by a mechanical interlock means.

The disclosed method may have the aspect of relative ease of manufacture since it may not be necessary to align an internal drill tip conduit with the orifice presented at the end of the shaft when joining the drill tip to the shaft. Furthermore, braze material that may be used to join the drill tip to the shaft may be removed when the internal drill tip shaft is formed by boring, thereby ensuring open communication between the internal shaft conduit and the internal drill tip conduit.

Non-limiting example arrangements of twist drill assemblies will now be described with reference to the accompanying drawings, of which

With reference to FIG. 1, FIG. 2, FIG. 3 and FIG. 4, an example arrangement of a twist drill assembly 10 comprises a drill tip 20 connectable to a shaft 30 at a proximate end 32 of the shaft 30. The shaft 30 is formed of cemented tungsten carbide material and has a single internal shaft conduit 34 for a fluid, extending between an inlet orifice 36 and two outlet orifices 37 at the proximate end 32. The drill tip 20 comprises PCD material and has an internal drill tip conduit 22 for the fluid, configured for receiving the fluid from the outlet orifices 37 of the shaft 30 through an inlet orifice 24 formed into the drill tip 20 and for discharging the fluid from outlet orifices 26 of the drill tip 20. The shaft 30 comprises a helical or spiral flute 38 extending from the proximate end 32. The wall of the internal shaft conduit 34 defines a helical ribbon in outline and is arranged such that the thicknesses of the shaft 30 between the wall of the internal shaft conduit 34 to the outer surfaces of the shaft 30, particularly the surfaces of the channels defined by the flutes 38, is maximised. In other words, the internal shaft conduit 34 is arranged to spiral cooperatively between the channels of the flutes 38. The internal shaft conduit 34 and the internal drill tip conduit 22 have sufficiently large lateral cross-section area to be capable of delivering coolant or lubricant fluid for discharge at the outlet orifices 26 of the drill tip 20 at a sufficient rate to promote the removal of debris from the drill tip 20, lubrication of the drill tip 20 or cooling of the drill tip 20 in use. Flutes 28 may be formed into the drill tip 20 and may be configured to correspond to the flutes 38 formed into the shaft 30.

Figure 1:
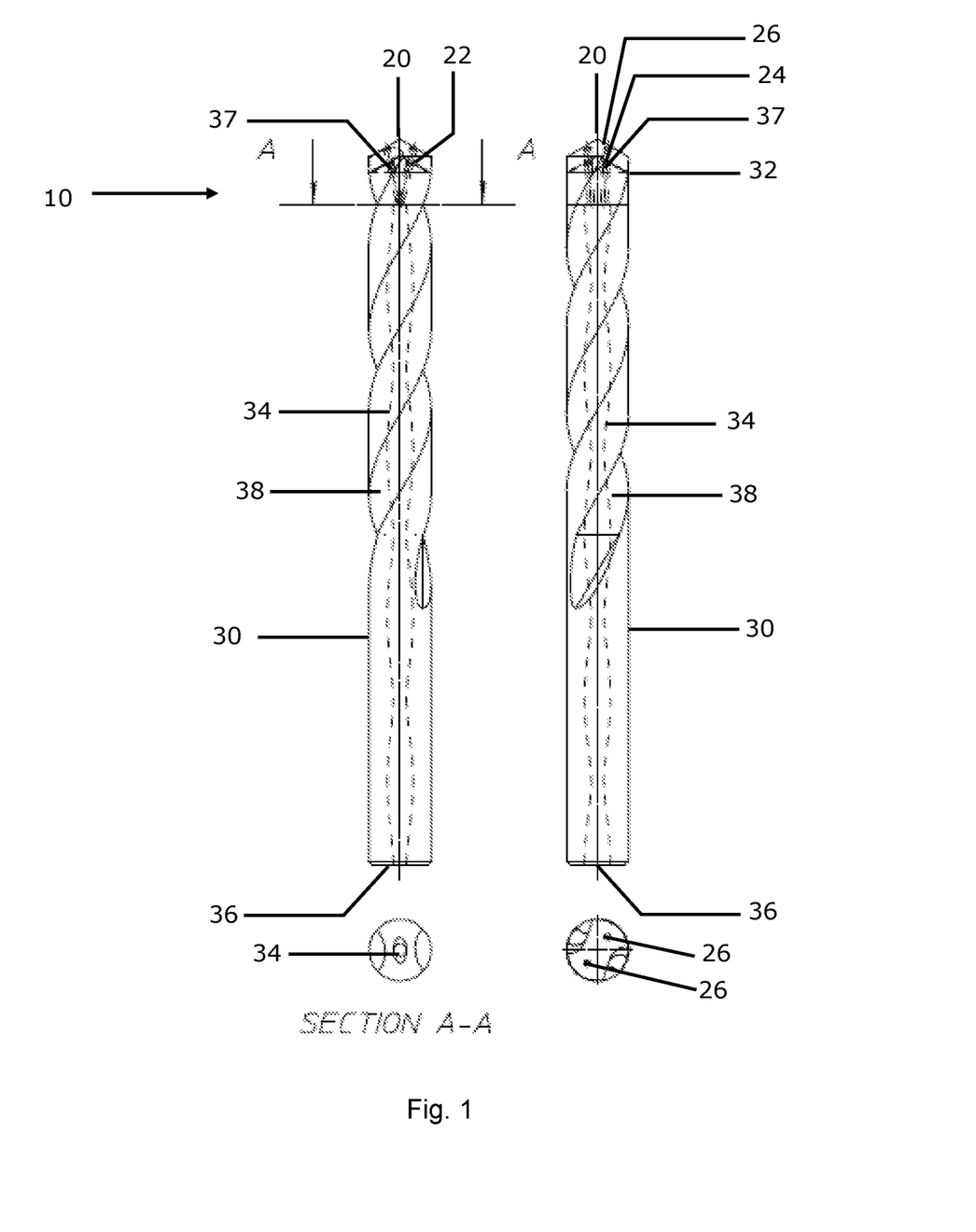
FIG. 1 shows schematic side views of an example twist drill with the internal shaft conduit shown as a dashed line. Top views of cross section A-A and of the drill tip are also shown.
Figure 2:
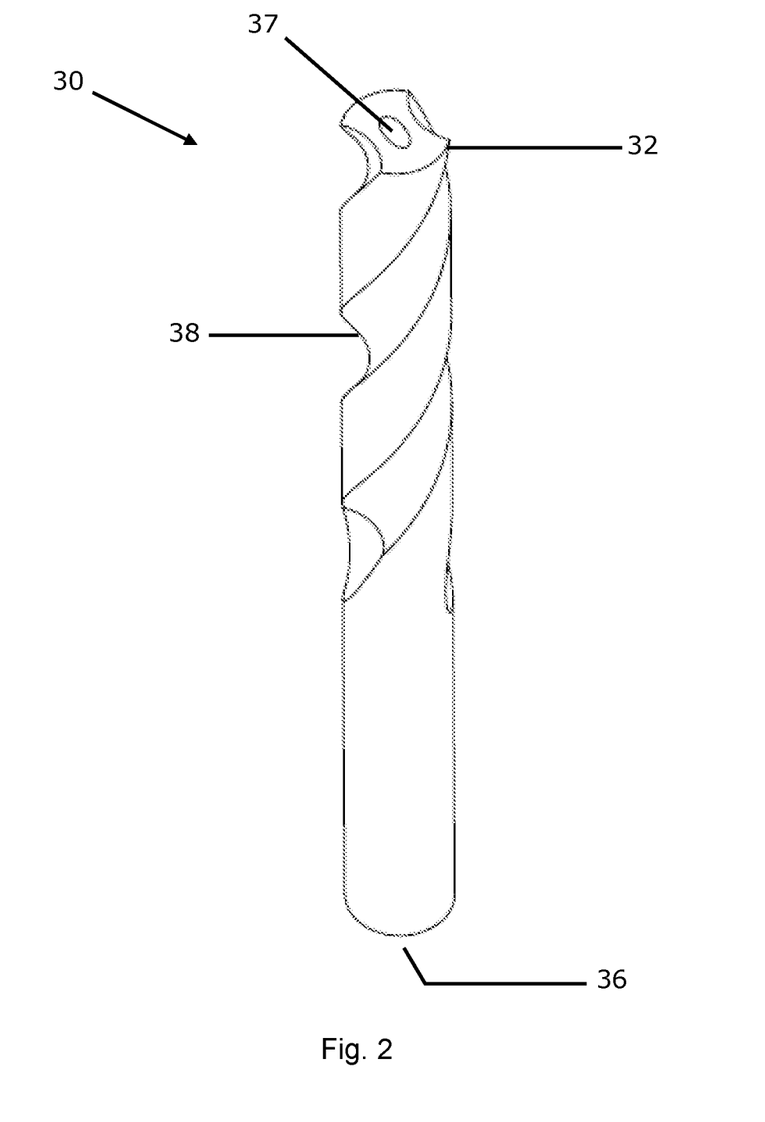
FIG. 2 shows a schematic perspective view of an example shaft for a twist drill.
Figure 3:
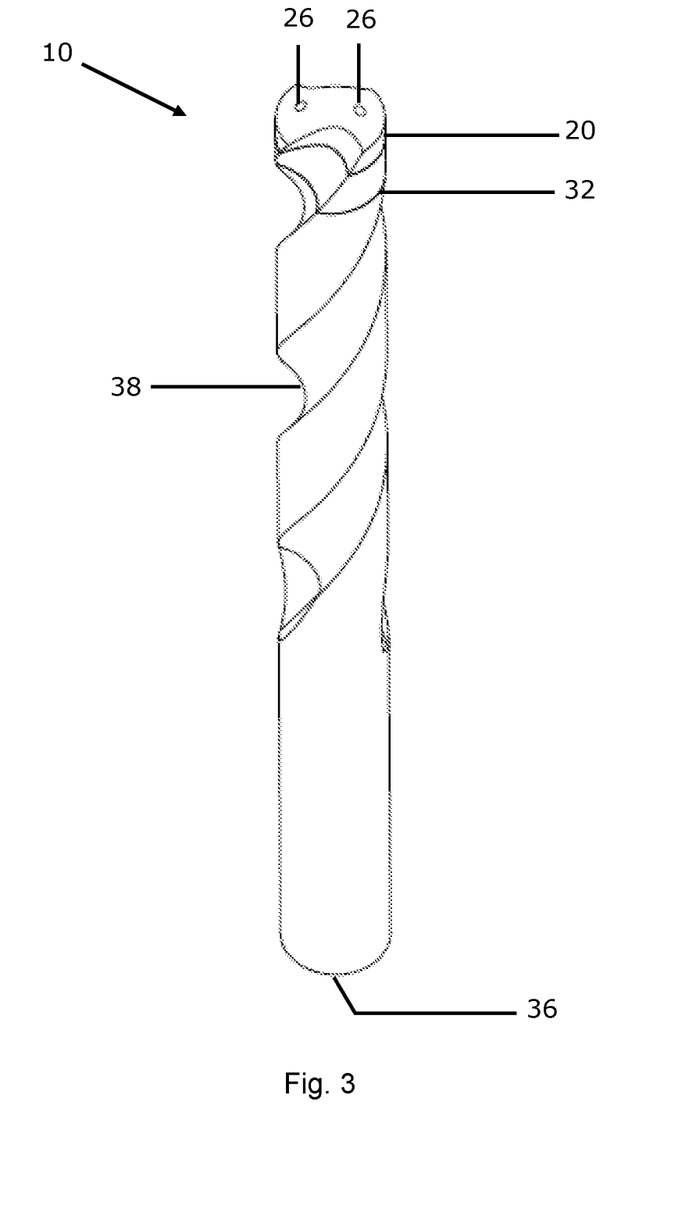
FIG. 3 shows a schematic perspective view of an example twist drill.
Figure 4:
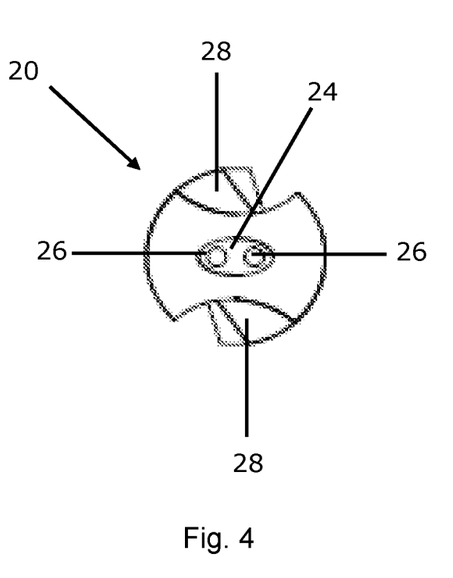
FIG. 4 shows a schematic view from below an example drill tip for a twist drill.
Figure 5:
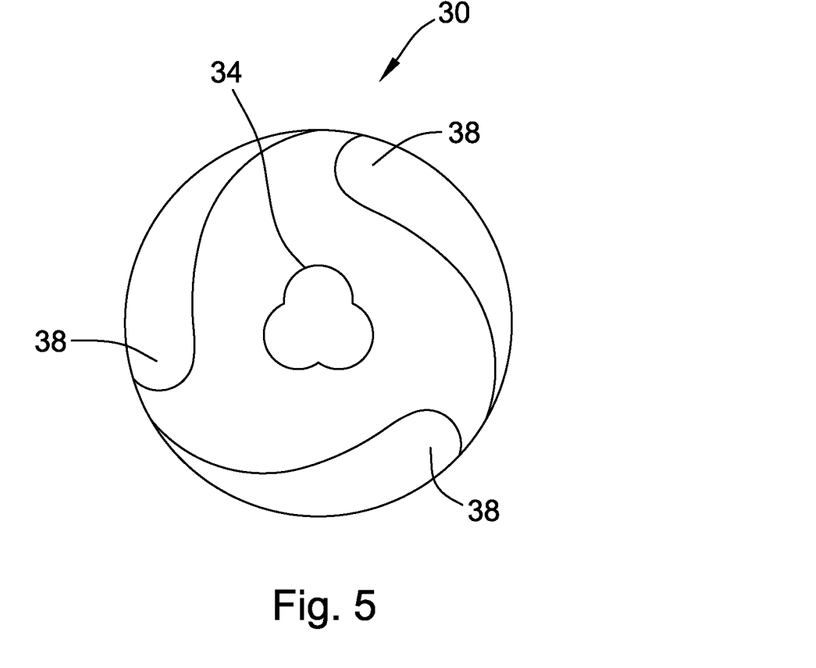
FIG. 5 is a schematic top view of another example shaft for a twist drill.

FIG. 5 is a schematic top view of an example shaft 30 that includes three flutes 38 and an internal shaft conduit 34 that presents a three-lobed shape in lateral cross section through the shaft 30.

Various methods of manufacturing a twist drill formed of a hard-metal and including at least one conduit are known in the art. For example, U.S. Pat. Nos. 4,059,031; 4,704,055; 4,779,440 and 5,780,063 describe methods that may be useful in this regard. In particular, U.S. Pat. No. 5,780,063 mentions that rods of hard metal or ceramic with at least one helical bore extending through it are known, and cites European patent application publication number 0 118 035 A1, German patent application publication number 3 600 681 A1, and U.S. Pat. No. 4,059,031 for example. The '063 patent describes a method and apparatus for providing a blank in the form of a rod of hard metal or ceramic with precisely twisted inner bores of a precise tolerance and constant pitch. In this method, a spinner is immersed in a plasticized mass comprising materials for the hard metal. Either the spinner twists the mass, resulting in a torsion that is radially uniform over the whole cross-section of the billet, or the mass twists the spinner. In the first case the spinner does not rotate and the mass is forced through the die under torsion and emerges from it subject to torsion. In the second case the spinner rotates and the mass is forced through the die under no or almost no torsion and emerges from it subject to almost no torsion. The helical inner bores can be produced by forcing a polymeric filament-like material into the travelling mass, being forced into the mass under pressure from outside at the speed at which the mass is travelling. The polymeric material is removed by evaporation by chemical or physical procedures prior to sintering the rod to form a hard metal rod including at least one internal channel.

Disclosed twit drill assemblies have the aspect of providing an enhanced drill tip comprising a superhard structure and being capable of delivering coolant, lubricant or flushing fluid through the superhard structure to the point of cutting adjacent the interface between the superhard structure and the surface of the body being drilled.

A non-limiting example twist drill assembly is described in more detail with reference to the example below, which is not intended to limit the invention.

A twist drill shaft may be made by a method including the steps of i) milling a powder blend of WC and Co particles, ii) introducing a binder into the milled powder blend and kneading the powder to form a plasticised mass, iii) extruding the plasticised mass and forming a single internal helical channel into the extruded rod using a straightforward variant of the method described in U.S. Pat. No. 5,780,063, iv) heat treating the extruded rod to dry it and removing the binder material and the polymeric filament material, v) sintering the rod, vi) straightening the rod and vii) grinding the rod to final dimensions and tolerances. The shaft may be provided with a helical flute extending away from the end at which the drill tip would be attached. The lateral cross sectional area of the shaft, excluding the flutes, may be about 49.5 mm$^2$.

A PCD disc may be sintered at an ultra-high pressure of about 5.5 GPa and a temperature of about 1,350 degrees centigrade, as is known in the art. A drill tip may be formed from the PCD disc by means of electro-discharge machining (EDM) and grinding. A pair of conduits may be formed into the PCD drill tip by means of EDM, both conduits having a common inlet and each having a respective outlet. The common inlet may be configured to match the cross sectional shape of the single helical, ribbon-like channel in the shaft. A pair of flutes may also be formed into the PCD drill tip and configured to match the flutes of the shaft.

Certain terms and concepts as used herein will be briefly explained below.

As used herein, a "machine tool" is a powered mechanical device, which may be used to manufacture components comprising materials such as metal, composite materials, wood or polymers by machining. As used herein, "machining" is the selective removal of material from a body or a workpiece. As used herein, a "rotary machine tool" is a machine tool comprising a cutter element, for example a drill bit, which rotates about its own axis in use.

As used herein, a "hard structure" and a "superhard structure" mean a structure comprising a hard and a superhard material, respectively. As used herein, a "hard material" is a material having a Vickers hardness of at least about 10 GPa and less than about 28 GPa. As used herein, a "superhard material" is a material having a Vickers hardness of at least about 28 GPa. Diamond, cubic boron nitride (cBN), polycrystalline diamond (PCD) and polycrystalline cubic boron nitride (PCBN) material are examples of superhard materials. As used herein, an "advanced ceramic material" is a ceramic material having hardness greater than that of cemented tungsten carbide.

Polycrystalline diamond (PCD) and polycrystalline cubic boron nitride (PCBN) are examples of polycrystalline superhard materials. As used herein, polycrystalline superhard (PCS) materials have a Vickers hardness of at least about 28 GPa. PCD and PCBN material may be made by sintering grains of diamond and cubic boron nitride (cBN), respectively, at an ultra-high pressure of several GPa. As used herein, "polycrystalline diamond" (PCD) material comprises a mass of diamond grains, a substantial portion of which are directly inter-bonded with each other and in which the content of diamond is at least about 80 volume percent of the material. In one embodiment of PCD material, interstices between the diamond grains may be at least partly filled with a binder material comprising a catalyst for diamond. As used herein, "interstices" or "interstitial regions" are regions between the diamond grains of PCD material. In embodiments of PCD material, interstices or interstitial regions may be substantially or partially filled with a material other than diamond, or they may be substantially empty. Embodiments of PCD material may comprise at least a region from which catalyst material has been removed from the interstices, leaving interstitial voids between the diamond grains. As used herein, "polycrystalline cubic boron nitride" (PCBN) material comprises a mass of cBN grains dispersed within a binder material and in which the content of cBN is at least about 50 volume percent of the PCBN material.

As used herein, a material that "consists essentially of" certain constituents means that the material consists of the constituents apart from minor amounts of unavoidable impurities.

As used herein, a "rake face" of a machine tool is the surface or surfaces over which the chips flow when the tool is used to remove material from a body, the rake face directing the flow of newly formed chips. As used herein, "chips" are the pieces of a body removed from the work surface of the body by a machine tool in use. As used herein, a "flank" of a machine tool is the surface or surfaces of the machine tool that passes over the machined surface produced on the body by a machine tool. The flank may provide a clearance from the body and may comprise more than one flank face. As used herein, a "cutting edge" is the edge of a rake face intended to perform cutting of a body. A "rounded cutting edge" is a cutting edge that is formed by a rounded transition between the rake face and the flank.

As used herein, a "flute" is a recessed portion of a rotary machine tool that is capable of conveying chips away from a cutting edge as the tool rotates in use. A twist drill may comprise two or more flutes, one for each cutting edge. Other rotary machine tools, such as taps, ball-nose end mills and straight end mills, which may sometimes be referred to as slot-drills, may have up to six or more cutting edges and flutes. As used herein, a "helical flute", which may also be known in the art as a "spiral flute", comprises a flute arranged generally and at least partially helically with respect to a rotational axis of a rotary machine tool. As used herein, a bi-directional helical flute configuration comprises flutes having different or opposite helical directions.

The invention claimed is:

1. A twist drill assembly comprising a shaft and a drill tip; the shaft having a single internal shaft conduit for a fluid, extending between orifices formed into the shaft; the drill tip having an internal drill tip conduit for the fluid, extending between orifices formed into the drill tip; the shaft and the drill tip configured such that the drill tip is connectable to an end of the shaft with the internal drill tip conduit in communication with the internal shaft conduit, allowing the fluid to be capable of flowing from the internal shaft conduit into the internal drill tip conduit; the internal shaft conduit having a spiral form aligned with a central longitudinal axis of the shaft, and configured to complement the arrangement of spiral flutes formed on the shaft; in which the shaft comprises three flutes and the internal shaft conduit presents a three-lobed shape in lateral cross-section through the shaft.

2. A twist drill assembly as claimed in claim 1, in which the internal shaft conduit is configured to have a sufficiently large cross-sectional area to allow a desired predetermined flux of fluid to pass through it, and configured within the shaft to maximise the thickness of the wall between the internal shaft conduit and the innermost surface of the flutes.

3. A twist drill assembly as claimed in claim 2, in which the drill tip comprises a structure consisting essentially of PCD material, the internal drill tip conduit being at least partly defined by the structure.

4. A twist drill assembly as claimed in claim 1, in which the internal shaft conduit is configured spirally in phase with the spiral flutes, the minimum thickness between the conduit and the flutes being constant along at least a major part of the length of the flutes.

5. A twist drill assembly as claimed in claim 4 in which the drill tip comprises a structure consisting essentially of PCD material, the internal drill tip conduit being at least partly defined by the structure.

6. A twist drill assembly as claimed in claim 1, in which the internal shaft conduit is configured spirally in phase with the spiral flutes, the minimum thickness between the conduit and the flutes increasing continuously from a proximate end of the shaft at which the drill tip is capable of being connected, towards an opposite distal end of the shaft.

7. A twist drill assembly as claimed in claim 1, in which the drill tip comprises a structure consisting essentially of PCD material, the internal drill tip conduit being at least partly defined by the structure.

8. A twist drill assembly as claimed in claim 7, in which the lateral cross-section area of the conduit is at most 10 percent of the lateral cross-section area of the shaft, excluding the flutes.

9. A twist drill assembly as claimed in claim 1, in which the drill tip comprises advanced ceramic material selected from the group consisting of tungsten carbide, titanium carbide, boron carbide, silicon carbide, silicon nitride, alumina and boron sub-oxide.

10. A twist drill assembly as claimed in claim 1, in which the lateral cross-section area of the internal shaft conduit is at most 10 percent of the lateral cross-section area of the shaft, excluding the flutes.

11. A twist drill assembly as claimed in claim 1, wherein the drill tip comprises a structure consisting essentially of PCD or PCBN material, the internal drill tip conduit being at least partly defined by the structure.

12. A twist drill comprising a twist drill assembly as claimed claim 1, the drill tip connected to the shaft by means of a braze material disposed between the drill tip and the shaft.

13. A twist drill assembly as claimed in claim 1, in which the drill tip comprises a structure consisting essentially of PCBN material, the internal drill tip conduit being at least partly defined by the structure.

14. A twist drill assembly as claimed in claim 13, in which the lateral cross-section area of the conduit is at most 10 percent of the lateral cross-section area of the shaft, excluding the flutes.

15. A twist drill assembly as claimed in claim 1, in which the drill tip consists essentially of PCD material.

16. A twist drill assembly as claimed in claim 1, in which the drill tip consists essentially of PCBN material.

17. A shaft for a twist drill assembly including a drill tip having an internal drill tip conduit, the shaft comprising a single internal shaft conduit for a fluid, extending between orifices formed into the shaft; the internal shaft conduit having a spiral form aligned with a central longitudinal axis of the shaft, configured to complement the arrangement of spiral flutes formed on the shaft, wherein the shaft is configured for connection to the drill tip at an end of the shaft such that the internal drill tip conduit is in communication with the internal shaft conduit, allowing the fluid to be capable of flowing from the internal shaft conduit into the internal drill tip conduit, wherein the shaft comprises three flutes and the internal shaft conduit presents a three-lobed shape in lateral cross-section through the shaft.

18. A method of making a twist drill comprising a twist drill assembly,
the twist drill assembly comprising a shaft and a drill tip;
the shaft having a single internal shaft conduit for a fluid, extending between orifices formed into the shaft, in which the shaft comprises three flutes and the internal shaft conduit presents a three-lobed shape in lateral cross-section through the shaft;
the drill tip having an internal drill tip conduit for the fluid, extending between orifices formed into the drill tip;
the shaft and the drill tip configured such that the drill tip is connectable to an end of the shaft with the internal drill tip conduit in communication with the internal shaft conduit, allowing the fluid to be capable of flowing from the internal shaft conduit into the internal drill tip conduit;
the internal shaft conduit presenting an orifice at an end of the shaft and having a spiral form aligned with a central longitudinal axis of the shaft, and configured to complement the arrangement of spiral flutes formed on the shaft;
the method including joining the drill tip to the end of the shaft by means of braze material disposed between the drill tip and the shaft; and boring at least one internal drill tip conduit through the drill tip, the internal drill tip conduit extending from a working surface of the drill tip to the orifice of the internal shaft conduit.

19. A method as claimed in claim 18, in which the drill tip comprises a super-hard structure consisting of PCD material and the method includes boring at least one internal drill tip conduit through the super-hard structure.

\* \* \* \* \*